Figure 1:
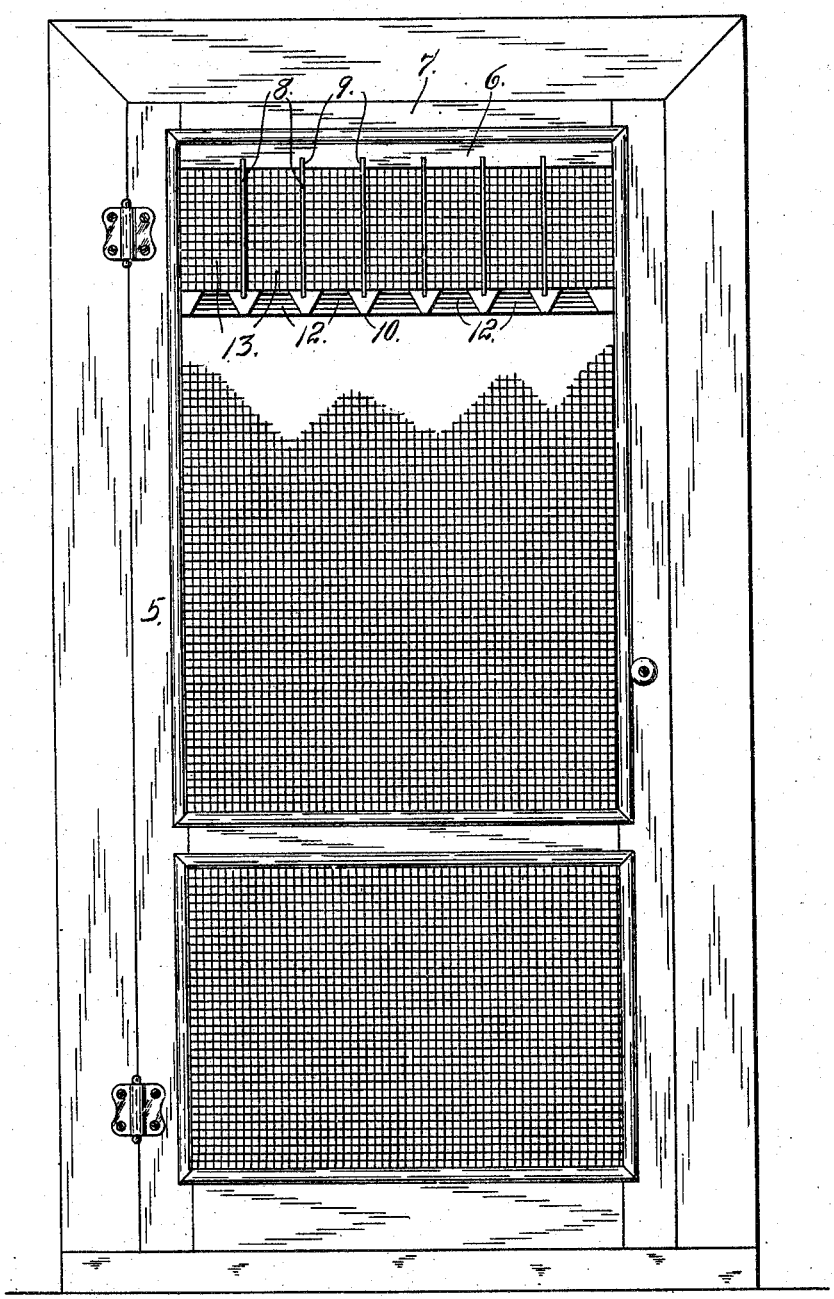

T. N. JONES.
FLY TRAP.
APPLICATION FILED JAN. 4, 1910.

981,089.

Patented Jan. 10, 1911.

2 SHEETS—SHEET 2.

Witnesses
Otto E. Hoddick
J. D. Thornburgh

Inventor
Theodore N. Jones
By C. J. O'Brien
Attorney

UNITED STATES PATENT OFFICE.

THEODORE N. JONES, OF BOULDER, COLORADO.

FLY-TRAP.

981,089.  Specification of Letters Patent.  Patented Jan. 10, 1911.

Application filed January 4, 1910. Serial No. 536,365.

*To all whom it may concern:*

Be it known that I, THEODORE N. JONES, a citizen of the United States, residing in the city and county of Boulder and State of Colorado, have invented certain new and useful Improvements in Fly-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in fly traps more especially adapted for use in connection with screen doors, though it may be used in other relations.

In the specific embodiment of the invention disclosed in the drawing, the trap is applied to the upper extremity of a screen door, being located on the inside thereof, and consists of a chamber formed between the two bars of the door frame, the outer wall of the chamber being closed by the mesh material of the door, while a special mesh member is applied to the inside of the door frame to complete the chamber, the last named mesh member being offset inwardly to increase the depth of the chamber. This chamber of the trap is provided with a number of removable partitions, whereby the chamber is separated into a series of vertically disposed compartments, each of which is in communication with an opening at the bottom of the chamber through which the flies may enter the latter as they crawl up on the inside of the mesh material with which the door is equipped. The opposite surfaces of the aforesaid partitions are coated with an adhesive substance which will catch and retain the flies in a manner similar to sticky fly paper. When these surfaces are sufficiently laden with flies which have been caught in the trap, they are removed and thrown away or burned and new partitions substituted and similarly coated. These partitions are preferably formed of thin cardboard or other cheap material and they may be prepared in any suitable manner.

Having briefly outlined my improved construction, I will proceed to describe the same in detail, reference being made to the accompanying drawing in which is illustrated an embodiment thereof.

Figure 2:
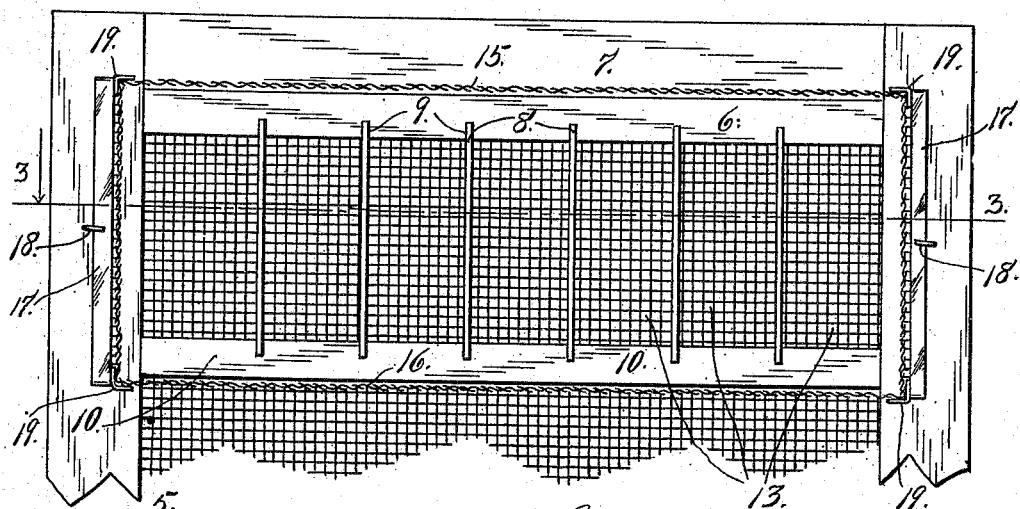
Figure 3:
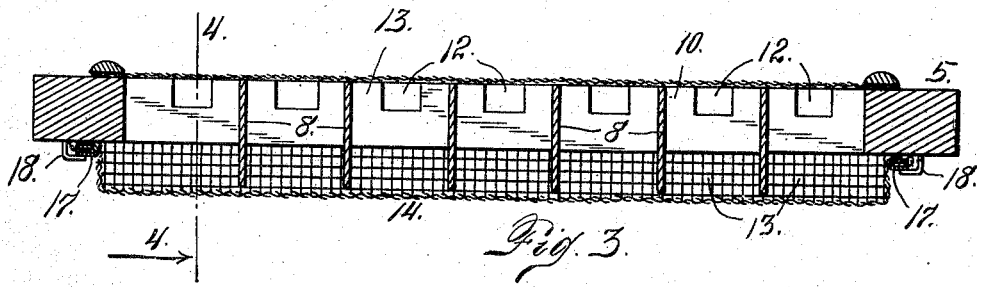
Figure 4:
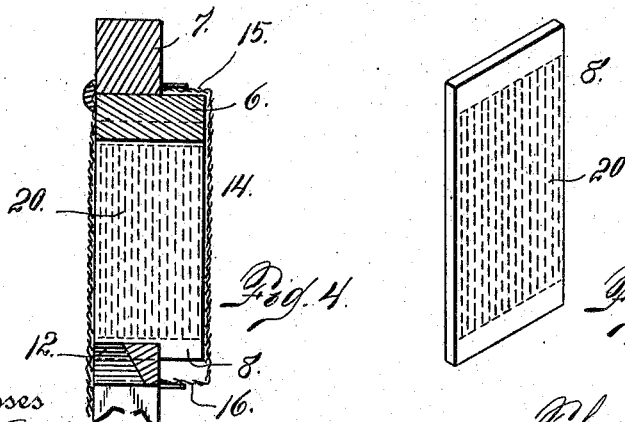
Figure 5:
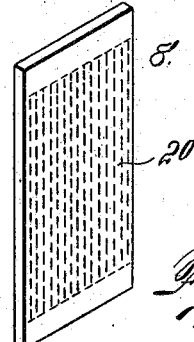

In this drawing: Figure 1 is an outside view of a screen door equipped with my improvement. Fig. 2 is an inside view of the upper portion thereof with the inner layer of mesh material removed, the part of the door below the trap being broken away. Fig. 3 is a horizontal section taken on the line 3—3, Fig. 2. Fig. 4 is a vertical section taken on the line 4—4, Fig. 3. Fig. 5 is a perspective detail view of one of the partitions coated with adhesive material.

The same reference characters indicate the same parts in all the views.

Let the numeral 5 designate a screen door of ordinary construction, except that its upper portion is equipped with my improved trap. As shown in the drawing the upper part of the door frame is provided with a bar 6 located just below the top frame bar 7 and projecting inwardly beyond the frame of the door to increase the depth of the chamber, and consequently the width or surface area of the partitions 8 which are inserted in narrow grooves or kerfs 9, formed in the bar 6 and also in a bar 10 located at the bottom of the chamber and provided with hopper-shaped openings 12 communicating with each compartment 13 into which the chamber is separated by the partitions 8. The chamber is closed on the inside by a mesh member 14, which engages the bar 6 on the inside and extends outwardly to the frame of the door, being offset both above and below the chamber as shown at 15 and 16, whereby the chamber is closed, except at the openings 12, the outer side of which is closed by the mesh material of the door.

The use of the device may be explained as follows: The flies that are in the house naturally go toward the light and gather upon the inner surface of the mesh material of the door. As they crawl upwardly on this material below the trap, they naturally will follow the mesh material and enter the openings 12 leading to the various compartments of the trap. Once within these compartments, which are relatively narrow, they will be quickly caught by adhesive substance 20 with which both surfaces of each partition is coated.

In order that the member 14 of the trap may be readily removable, its ends are provided with flanges 17, the said member being held in place by pivoted hooks 18, which are adapted to be swung in the one direction or the other, according as it is desired to lock the member 14 in place to close the trap or to remove the same in order to gain access to the partitions 8 in order to remove the flies that are caught.

It is evident that this trap will also be useful in catching other insects, though it is more especially adapted for use in catching flies.

The extremities of the small plates 17, forming the end flanges of the member 14, are equipped with small angle members 19 which engage the corners of the mesh material of the member 14 and aid in maintaining the proper shape of the latter. These small angle-plates may be soldered to the parts 17 or secured thereto in any other suitable manner.

Having thus described my invention, what I claim is:

1. A fly trap for screen doors, comprising a chamber formed upon the door between the frame bars thereof and equipped with removable partitions, the said chamber having openings from below communicating with the several compartments into which it is formed by the partitions, the said chamber having a cover removable to give access to the partitions, the latter being coated with an adhesive substance, for the purpose set forth.

2. A screen door equipped with a trap consisting of a chamber provided with removable partitions coated with an adhesive substance, the chamber having a removable cover composed of mesh material, the bottom of the chamber having openings communicating with the various compartments into which the chamber is divided by the partitions, substantially as described.

3. A screen door, or similar structure, having a chamber formed in the upper part thereof and provided with a removable cover having a wall of mesh material parallel with the mesh material of the door but separated therefrom to give the chamber sufficient volume for the purpose, the chamber being equipped with removable vertically disposed partitions forming the chamber into a number of compartments the partitions being coated with an adhesive substance, the lower part of the chamber having openings communicating with the respective chamber compartments formed by the partitions, substantially as described.

4. A screen door or similar structure having a chamber formed in its upper portion, the mesh material of the door forming one wall of the chamber, and a removable cover having a mesh member parallel with the mesh material of the door and forming the opposite wall of the chamber, the latter being equipped with removable partitions, forming the chamber into a number of compartments which are open from below to allow the flies to enter, the partitions being coated on both surfaces with an adhesive substance, for the purpose set forth.

5. A screen door having separated horizontally disposed bars interposed between its vertical frame members, the said bars having kerfs, partitions coated with an adhesive substance and removably engaging said kerfs, forming the chamber into a series of vertically disposed compartments, the lower bar having hopper-shaped openings to allow the flies to enter the respective chamber compartments from below, the said chamber being equipped on the inside with a removable mesh covering, for the purpose set forth.

In testimony whereof I affix my signature in presence of two witnesses.

THEODORE N. JONES.

Witnesses:
A. J. O'Brien,
Jessie F. Hobart.